United States Patent [19]

Stevens

[11] 4,144,262

[45] Mar. 13, 1979

[54] TRIALLYL CARBONATE MONOMERS

[75] Inventor: Henry C. Stevens, Akron, Ohio

[73] Assignee: PPG Industries, Inc., Pittsburgh, Pa.

[21] Appl. No.: 839,684

[22] Filed: Oct. 5, 1977

[51] Int. Cl.$^2$ ............................................. C07C 69/96
[52] U.S. Cl. ...................................... 260/463; 526/330
[58] Field of Search ......................................... 260/463

[56] References Cited

U.S. PATENT DOCUMENTS

| 2,370,567 | 2/1945 | Muskat et al. | 260/463 |
|---|---|---|---|
| 2,384,115 | 9/1945 | Muskat et al. | 260/78 |
| 2,384,123 | 9/1945 | Muskat et al. | 260/78 |
| 2,385,930 | 10/1945 | Muskat et al. | 260/78 |
| 2,385,932 | 10/1945 | Muskat et al. | 260/78 |
| 3,785,850 | 1/1974 | Parker | 260/77.5 UA |

FOREIGN PATENT DOCUMENTS 606716  8/1948  United Kingdom.

*Primary Examiner*—Elbert L. Roberts
*Assistant Examiner*—Molly C. Eakin
*Attorney, Agent, or Firm*—Richard M. Goldman

[57] ABSTRACT

Disclosed are tris(allyl carbonate) monomers and polymers made therefrom.

2 Claims, No Drawings

TRIALLYL CARBONATE MONOMERS

DESCRIPTION OF THE INVENTION

Bis(allyl carbonate) monomers find utility in the formation of optical polymers, for example, for lenses, as glazing materials and tough, transparent articles. However, bis(allyl carbonates) are characterized by about 13 percent shrinkage during polymerization. It has now been found that certain tris(allyl carbonate) monomers provide polymers having equally satisfactory properties and yet exhibit less shrinkage on polymerization.

The monomer of this invention has the empirical formula:

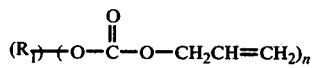

where $R_1$ may be a moiety derived from a polyol, a triol, or an extended polyol such as a lactone extended polyol or an epoxide extended polyol, or an extended triol such as a lactone extended triol or an epoxide extended triol where the hydroxyl groups of the precursor polyol $R_1(OH)_n$ are non-vicinal and n is greater than 2.

Tris(allyl carbonates) may be prepared by either of two synthesis routes. According to one synthesis route, the polyol or extended polyol is phosgenated to form a chloroformate, e.g., a tris(chloroformate). Subsequently, the reaction product of the phosgene and polyol is reacted with allyl alcohol to form a polyfunctional allyl carbonate monomer.

According to the alternative synthesis route, allyl alcoyol is phosgenated to form allyl chloroformate. The allyl chloroformate is subsequently reacted with the polyol or extended polyol to form the polyfunctional allyl carbonate.

The polymerization is typically a free radical initiated polymerization whereby a clear, transparent polymerizate is formed having good abrasion resistance and good impact resistance. Furthermore, the polymerizate is capable of being dyed and being rendered photochromic.

DETAILED DESCRIPTION OF THE INVENTION

Poly(allyl carbonates) are useful in providing optical plastics, for example, lenses, especially lenticular lenses and bifocals. It has now been found that a particularly outstanding family of allyl carbonate monomers are trifunctional allyl carbonates, that is, allyl carbonates having the general formula:

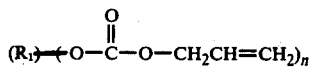

where $R_1$ is an organic moiety chosen from the group consisting of moieties derived from polyols and extended polyols, most frequently a triol or extended triol where the hydroxyl groups of the precursor polyol $R_1(OH)_n$ are non-vicinal and n is greater than 2, e.g., from 2.2 representing a mixture of diols and higher polyols to about 8 representing a derivative of trimeric pentaerythritol. By "non-vicinal" it is meant that the hydroxyl groups are not on adjacent carbons. Specific triol precursors useful in preparing the tris(allyl carbonate) materials of this invention are triols with primary or secondary hydroxyl groups. Triols having primary hydroxyl groups are preferred, as will be described more fully hereinafter. One such class of triols are 1,1,1-trimethylol alkanes. Also useful are extended trimethylol alkane tris(allyl carbonate) monomers such as lactone extended trimethylol alkanes and alkyl oxide extended trimethylol alkanes. By an extended triol is meant the reaction product having terminal hydroxyl groups of the triol and a suitable reactant, e.g., an alkyl oxide or a lactone. Typical lactone extended trimethylol alkanes include $\epsilon$-caprolactone extended trimethylol methane, $\epsilon$-caprolactone extended trimethylol ethane, $\epsilon$-caprolactone extended trimethylol propane, and $\epsilon$-caprolactone extended trimethylol butane. Typical alkyl oxide extended triols include ethylene oxide extended trimethylol methane, ethylene oxide extended trimethylol ethane, ethylene oxide extended trimethylol propane, ethylene oxide extended trimethylol butane, propylene oxide extended trimethylol methane, propylene oxide extended trimethylol methane, propylene oxide extended trimethylol ethane, propylene oxide extended trimethylol propane, and propylene oxide extended trimethylol butane.

According to the method of this invention, the polyol is phosgenated to form a tris(chloroformate) which is then reacted with allyl alcohol to form the tris(allyl carbonate). It is necessary that there be at least three carbon atoms between the adjacent hydroxyls of the polyol in order to avoid cyclization during the phosgenation. Furthermore, in order to provide a stable chloroformate, the terminal hydroxyl groups of the polyol subject to phosgenation preferably should be primary hydroxyl groups.

The preferred polyols meeting these requirements have the general formula $R_f(OH)_n$ where n is greater than 2 up to about 8 and generally is about 3. $R_1$ can be

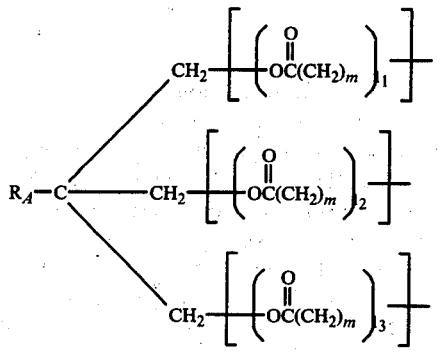

where $R_A$ is H, $-CH_3$, $-CH_2CH_3$, $-CH_2CH_2CH_3$, or $-CH_2CH_2CH_2CH_3$, and $l_1$, $l_2$ and $l_3$ are each integers from 0 to 5 and the sum of $l_1 + l_2 + l_3$ is 2 or more and generally from 2 to 8, although values as high as 15 are possible. The value of m depends on the lactone utilized to extend the polyol and is generally 4 or 5.

The chain extending lactone may be a delta lactone having the formula:

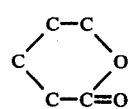

which can be substituted with hydrogen, methyl groups, or ethyl groups.

According to a still further exemplification of this invention, the chain extending lactone group can be an epsilon lactone having the formula:

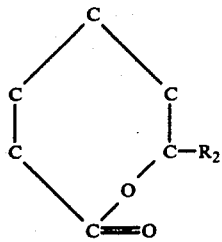

where $R_2$ is hydrogen, a methyl group, or an ethyl group and where $R_2$ can be on any of the carbons other than the carbonyl carbon. One exemplary triol useful in the practice of this invention is Union Carbide Corporation NIAX® PCP-0301 brand epsilon-caprolactone extended trimethylol propane.

According to a still further exemplification of this invention, $R_1$ can be

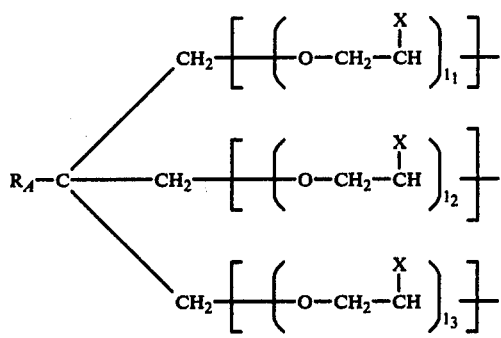

where $R_A$ is as defined previously, $l_1$, $l_2$ and $l_3$ are integers from 0 to 5 and the sum of $l_1 + l_2 + l_3$ is 2 or more and generally from about 2 to 8, although values as high as about 15 are possible, and X is H or $CH_3$. The chain extenders may be ethylene oxide groups as exemplified by Upjohn ISONOL® 93 ethylene oxide extended trimethylol propane. Alternatively, the extenders may be propylene oxide groups as in BASF-Wyandotte *PLURACOL TP* brand propoxylated trimethylol propane.

According to a still further exemplification of this invention, $R_1(OH)_3$ may be an extended glycerol, for example, ethylene oxide extended glycerol having the general formula:

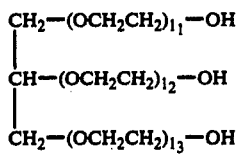

or propylene oxide extended glycerol having the formula:

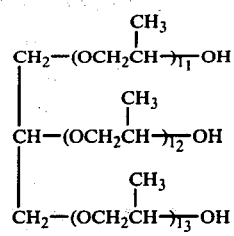

or a lactone extended glycerol having the formula:

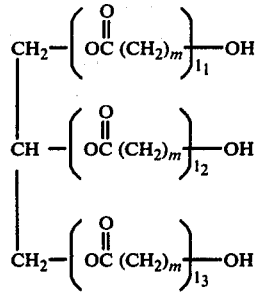

where m and $l_1$, $l_2$ and $l_3$ are as defined above. Typical propoxylated glycerines include *DOW VORANOL* 2025 brand propoxylated glycerine having a molecular weight of about 260 grams per gram mole, *DOW VORANOL* 2070 brand propoxylated glycerine having a molecular weight of about 700 grams per gram mole, and BASF-Wyandotte *PLURACOL GP730* brand propoxylated glycerine having a molecular weight of about 730 grams per gram mole.

According to a still further exemplification of this invention, the $R_1(OH)_n$ can be an extended pentaerythritol or an extended poly pentaerythritol. Pentaerythritol can be extended with lactones and epoxides. One such extended pentaerythritol polyol is BASF-Wyandotte PEP brand propoxylated pentaerythritol having a molecular weight of about 400 grams per gram mole.

The preferred starting materials useful in providing the tris (allyl carbonates) of this invention are trimethylol alkanes, for example, trimethylol ethane, trimethylol propane, and trimethylol butane which can be extended as described hereinabove. Additionally, entirely satisfactory results may be obtained with extended glycerols, as well as with extended polyols originally having vicinal alcohol groups such as extended naturally occurring sugars.

The tris(allyl carbonate) of this invention may be prepared by the phosgenation of a triol to form a trichloroformate and the subsequent reaction of the chloroformate with allyl alcohol to form a tris(allyl carbonate) monomer. While the allyl alcohol can be phosgenated to yield the allyl chloroformate which may be subsequently reacted with the triol to form a tris(allyl carbonate), as a matter or convenience, it is preferred to phosgenate the polyol inasmuch as allyl chloroformate is a powerful lachrymatory agent.

Preferably, the triol is one having primary hydroxyl groups inasmuch as primary chloroformates have greater thermal stability against decomposition than do either secondary chloroformates or tertiary chloroformates.

In order to avoid cyclization of the triol during phosgenation and the formation of cyclic carbonates, the triol should be extended to provide at least three carbon atoms between adjacent hydroxyl groups.

As described above, lactone extended polyols and epoxide extended polyols are useful in the practice of this invention. Lactone extended polyols may be prepared, for example, by reacting epsilon caprolactone with a triol in the presence of a suitable catalyst, e.g., dibutyl tin oxide, under an inert atmosphere and at an elevated temperature, whereby to extend the triol. Epoxide extended triols may be prepared by reacting an alkyl oxide, e.g., ethylene oxide or propylene oxide, with a triol in the presence of a catalyst, e.g., sulfuric acid, in a suitable solvent whereby to extend the triol.

While the invention is illustrated with respect to triols, polyols having more than three hydroxyl groups may be utilized. For example, pentaerythritol extended with ethylene oxide, propylene oxide, or epsilon caprolactone may be utilized as the polyol, as described above. Alternatively, the polyol can be a dimer or trimer of pentaerythritol, extended as described above. According to a still further exemplification of this invention, the polyol may be a naturally occurring material having vicinal hydroxyl groups, which naturally occurring material is extended with ethylene oxide, propylene oxide, or a lactone, as described above.

The triol is then phosgenated to form a chloroformate. The phosgenation is typically carried out by adding the triol to phosgene in a cooled reactor, for example, a reactor maintained at a temperature of about 0° C. to about 5° C. Phosgene is typically present in excess, for example, from about a 5 mole percent excess to about a 25 mole percent excess and preferably from about 10 to about 15 mole percent excess. The reaction mixture is thereafter degassed, for example, by passing an inert gas through it such as nitrogen, neon, helium, argon, or the like at atmospheric pressure or even at reduced pressure.

Thereafter, the chloroformate, for example, a tris(chloroformate), is reacted with allyl alcohol to form the allyl carbonate, for example, a tris(allyl carbonate). In forming the allyl carbonate, a batch of the tris(chloroformate) and allyl alcohol in a suitable solvent is formed to which is added an aqueous alkali metal hydroxide, for example, sodium hydroxide. There is generally from about a 10 to about 30 percent excess of allyl alcohol in the reaction mixture and from about a 10 to about 30 mole percent excess of the alkali metal hydroxide. The reaction is continued until substantially all of the chloroformate is reacted. The alkali metal hydroxide is normally added dropwise while cooling the reaction mixture. Thereafter, the reaction mixture separates into an organic phase, an aqueous phase, and a salt phase. After dissolving the salt phase, the organic phase is recovered and is purified, for example, by water extraction, drying, filtration, topping under vacuum, and the like.

The reaction may be carried out in the presence of a solvent. The solvent used in carrying out the formation of the allyl carbonate should be a material that may be recovered from the allyl carbonate in order to provide a substantially pure allyl carbonate, for example, an organic compound having a high vapor pressure such as methylene chloride.

The tris(allyl carbonate) is then polymerized, for example, by providing the monomer in a casting shell, a mold, or a pattern, for example, two surfaces of the desired shape of the lens and separated by a flexible gasket. The polymerization is a highly exothermic addition polymerization of a thermosetting resin. The polymerization is promoted by free radical initiators, for example, organic percarbonates. The chain propagation is controlled by adjusting the temperature. Suitable free radical initiators include benzoyl peroxide, isobutyryl peroxide, di(2-ethylhexyl)peroxydicarbonate, acetyl cyclohexane sulfonyl peroxide, di-sec-butyl peroxydicarbonate, diisopropyl peroxydicarbonate, dichlorobenzyl peroxide, t-butyl peroxy pivalate, pelargonyl peroxide, decanoyl peroxide, lauroyl peroxide, propanyl peroxide, 2,5-dimethyl-2,5-bis(2-ethylhexanoylperoxy)hexane, acetyl peroxide, succinic acid peroxide, t-butyl peroxyoctoate, p-chlorobenzoyl peroxide, t-butyl peroxyisobutyrate, t-butyl peroxymaleic acid, bis(1-hydroxycyclohexyl) peroxide, 1-hydroxy-1'-hydroperoxydicyclohexyl peroxide, t-butyl peroxy isopropyl carbonate, 2,5-dimethyl-2,5-bis(benzoyl peroxy) hexane, t-butyl peroxyacetate, methylethyl ketone peroxide, di-2-butyl-diperoxyphthalate, t-butyl peroxy benzoate, n-butyl-4,4-bis(t-butyl peroxy) valerate, 2,5-dimethyl-2,5-bis(t-butyl peroxy) hexane, t-butyl hydroperoxide, 3,5-dimethyl-3,5-dihydroxy-1,2-peroxy cyclopentane, di-t-butylperoxide, 2,5-dimethyl-2-5-bis(t-butyl peroxy) hexane-3, 1,1,3,3-tetramethylbutyl hydroperoxide, and t-butyl hydroperoxide. Particularly preferred because of its commercial availability and ease of measuring small amounts is secondary butyl peroxydicarbonate. Also preferred is diisopropyl peroxydicarbonate.

Chain propagation is controlled by adjusting the temperature cycle. The temperature of the reaction may be maintained isothermal, between 30° C. to 120° C., for example, at about 60° C.–80° C. with benzoyl peroxide initiator or at about 35° C.–55° C. with isopropyl peroxydicarbonate initiator. Alternatively, there may be a controlled increase in temperature over a 12 to 24 hour cycle, for example, increasing the temperature by about 20° C. over the time of the reaction. When the temperature is increased, it may be increased in stepwise increments or continuously.

The amount of initiator is generally from about 0.1 to about 10 weight percent, basis weight of the monomer. Preferably, the amount of initiator is from about 1 to about 8 weight percent, basis weight of the monomer.

When the triol is a highly viscous liquid, for example, a lactone extended polyol, it may be necessary to polymerize the triol in the presence of a low viscosity material in order to avoid bubble formation. According to one exemplification of this method of the invention, the low viscosity material may be a co-monomer as diethylene glycol bis(allyl carbonate), methyl methacrylate, or ethyl methacrylate.

According to this invention, there is obtained a solid, cross-linked polymer of the tris(allyl carbonate)

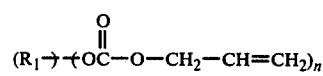

having carbonate repeating units and the general structure;

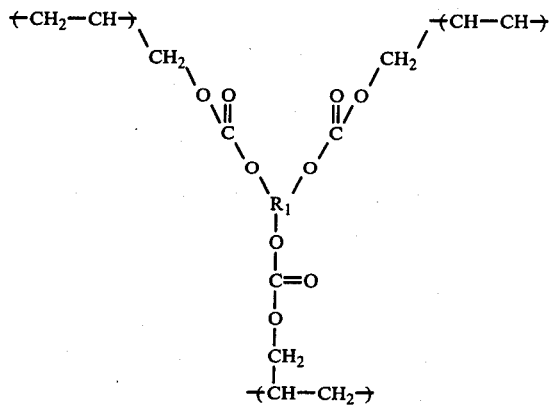

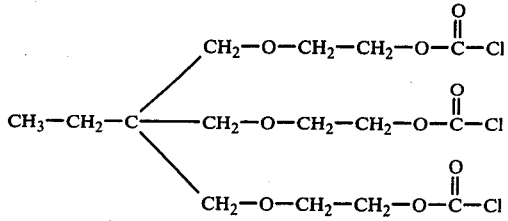

ature to form chloroformate having the general structure;

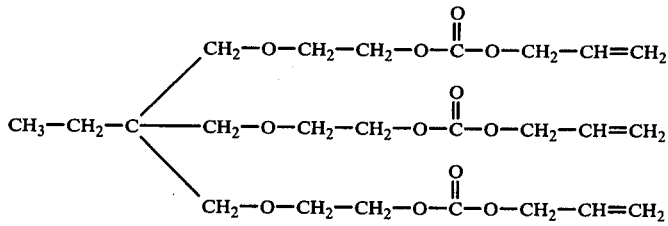

The chloroformate is recovered and a reaction medium of chloroformate, allyl alcohol, and a solvent is prepared. To this reaction medium is added sodium hydroxide dropwise whereby to form a tris(allyl carbonate) having the general formula;

$$CH_3-CH_2-C\begin{cases}CH_2-O-CH_2-CH_2-O-\overset{O}{\underset{\|}{C}}-O-CH_2-CH=CH_2\\CH_2-O-CH_2-CH_2-O-\overset{O}{\underset{\|}{C}}-O-CH_2-CH=CH_2\\CH_2-O-CH_2-CH_2-O-\overset{O}{\underset{\|}{C}}-O-CH_2-CH=CH_2\end{cases}$$

where $R_1$ is as defined previously.

Thus, according to the method of this invention, a lens may be prepared by first extending trimethylol propane having the general formula;

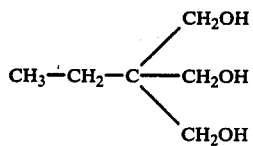

with ethylene oxide to obtain a monomer having the general structure;

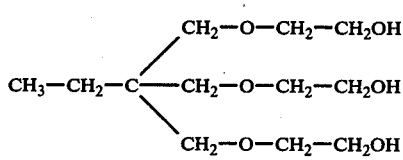

It is to be understood that the ethoxylation is not strictly stoichiometric and some hydroxyl groups may not be ethoxylated at all while other hydroxyl groups may have polyether chains several ethylene oxide units in length. Thereafter, the ethylene oxide extended trimethylol propane is reacted with phosgene by the dropwise addition of the triol to phosgene at a controlled temper- The tris(allyl carbonate) may then be polymerized, for example, by providing a mold of the desired shape and placing a reaction mixture of the tris(allyl carbonate) and from about 0.1 to about 10 weight percent of the di-sec-butyl peroxydicarbonate in the mold. The temperature of the mold is then raised to about 40° C. and then slowly raised from 40° C. to about 100° C. over a period of 24 hours. Thereafter, there is obtained a solid, cross-linked polymerizate of tris(allyl carbonate), which polymer has carbonate repeating units.

The following examples are illustrative.

EXAMPLE I

A tris(allyl carbonate) monomer was prepared by forming the tris(chloroformate) of a caprolactone extended trimethylol propane and thereafter reacting the tris(chloroformate) with allyl alcohol to form the tris(allyl carbonate).

Union Carbide NIAX ® PCP-0301 brand caprolactone polyol, the reaction product of trimethylol propane and epsilon-caprolactone was utilized as the triol. The triol has an average molecular weight of 300 grams per gram mole, a hydroxyl number of 560 milligrams of KOH per gram, and an acid number of 0.3 milligrams of KOH per gram. NIAX ® PCP-0301 is a mixture having as its major constituents:

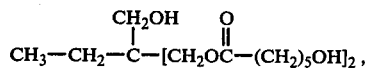

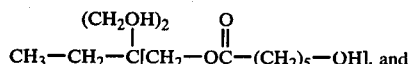

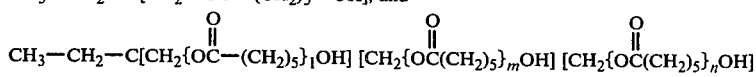

where l, m, and n are integers from 0 to 3.

The reaction was carried out in a three-necked, one liter, Morton type flask immersed in an ice water bath and fitted with a Dewar type condenser, a stirrer, and a thermometer. The initial charge to the flask was 346 grams of phosgene. Then, 300.4 grams of the triol was added to the flask over a period of 3 hours and 45 minutes while maintaining the temperature in the flask at 2° C. to 5° C. and stirring the reaction medium at 400 revolutions per minute. The reaction medium was then stirred for 16 hours while the temperature increased to 22° C. The resulting product was a clear, light brown, slightly viscous but stirrable liquid.

The liquid was degassed by passing nitrogen through it at a flow rate of 525 cubic centimeters (standard temperature and pressure) per minute for 72 hours at room temperature while stirring. The solution weighed 455.2 grams. This is a 90.4 percent yield for the formation of the tris (chloroformate). The reaction product had a chloroformate chlorine content of 18.8 percent and 0.14 percent acidity as hydrogen chloride. The phosgene content was less than 0.01 percent.

The tris(chloroformate) was then reacted with allyl alcohol in the presence of sodium hydroxide and methylene chloride to form the tris tris(allyl carbonates) as follows.

A liquid composition was prepared in a three-necked, three liter, Morton type flask containing 433.7 grams of the previously prepared tris(chloroformate), 164.6 grams of allyl alcohol, and 900 milliliters of methylene chloride. To this liquid composition, which was maintained in an ice water bath and under a nitrogen pad, 217.1 grams of 50.8 percent aqueous sodium hydroxide was added over a period of one hour and 10 minutes at 4° C. to 10° C. while stirring at 500 revolutions per minute. The solution changed from a light brown color to a cream color. Stirring was continued for 11 hours at which time no chloroformate was detectable.

Five hundred milliliters of distilled water was added to the reaction mixture and the mixture was stirred for several minutes. The phases separated rapidly into a light green to yellow organic phase and a clear aqueous phase. The organic phase was then washed successively with 400 milliliters of distilled water, 500 milliliters of 2 percent hydrochloric acid, and 875 milliliters of distilled water and then allowed to stand for 16 hours.

The emulsion which had formed after the last wash had separated into an aqueous phase having a pH of 2 to 3 and a pink colored organic phase. The organic phase was extracted twice with water and dried with anhydrous granular sodium sulfate for approximately 60 hours. The resulting clear, yellow organic liquid was then filtered through number 41 filter paper and solvent stripped to a constant weight in a rotary evaporator at 0.5 millimeter pressure in a 50° C. to 57° C. bath yielding 459.7 grams of a clear, yellow, viscous liquid. This is 95.1 percent of the theoretical yield of the tris(allyl carbonate). The product contained less than 0.02 weight percent water, 0.10 weight percent hydroxyl, 0.01 weight percent chloride, and had an acid number of 0.06. It had a density of 1.138 grams per cubic centimeter at 25° C., a viscosity of 510 centistokes at 25° C., and an unsaturation value of 87 percent of theoretical.

EXAMPLE II

A tris(allyl carbonate) monomer was prepared by forming the tris(chloroformate) of an ethylene oxide extended trimethylol propane and thereafter reacting it with allyl alcohol to form the tris(allyl carbonate).

Upjohn ISONOL® 93 brand ethoxylated trimethylol propane was utilized as the triol. The triol has an average molecular weight of 259.7 grams per mole and a hydroxyl number of 648 milligrams of KOH per gram. It is a mixture having as its major constituents:

$$CH_3-CH_2-C-\{CH_2-O-CH_2-CH_2-OH\}_3;$$

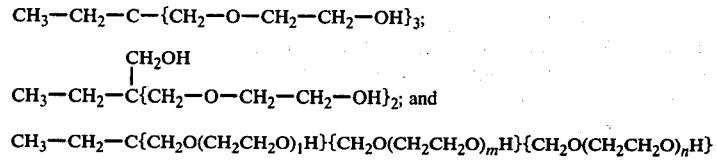

$$CH_3-CH_2-C\{CH_2O(CH_2CH_2O)_lH\}\{CH_2O(CH_2CH_2O)_mH\}\{CH_2O(CH_2CH_2O)_nH\}$$

where l, m, and n are integers from 0 to 3.

The chloroformate formation reaction was carried out in a three-necked, one liter Morton type flask fitted with a thermometer, a stirrer, and a Dewar type condenser and the flask was immersed in an ice water bath. The initial charge to the flask was 349 grams of phosgene. Then 270.2 grams of the triol was added dropwise over 3 hours and 40 minutes at 2° C. to 6° C. with stirring at 300 revolutions per minute.

After stirring overnight while the temperature gradually increased to 22° C., a colorless, low viscosity reaction product was obtained. This product was degassed with nitrogen at a feed rate of 325 cubic centimeters per minute for 2 hours and 25 minutes, and thereafter at a rate of 148 cubic centimeters per minute for four days while stirring at 400 revolutions per minute at 22° C. The colorless liquid weighed 454.3 grams, a 97.7 yield based on tris(chloroformate) formation. The product contained less than 0.01 weight percent phosgene and substantially no hydrogen chloride. The liquid contained 22.47 weight percent chloroformate chlorine by treatment with aqueous pyridine and analysis for chloride ion by the "Volhard method".

The tris(chloroformate) was then reacted with allyl alcohol in the presence of sodium hydroxide and methylene chloride to form the tris (allyl carbonate) as follows:

A liquid composition was prepared containing 440.0 grams of the tris(chloroformate) prepared previously, 199.5 grams of allyl alcohol, and 900 milliliters of methylene chloride. To this liquid composition, which was maintained at 2° C. to 10° C. in an ice water bath and under a nitrogen pad, 266.4 grams of 50 weight percent aqueous sodium hydroxide was added dropwise over a period of 2 hours while stirring at 400 revolutions per minute. Stirring was continued for 16 hours at 3° C. to 13° C. until no chloroformate was detectable.

The reaction mixture, consisting of aqueous, organic, and solid salt phases, was diluted with 500 milliliters of distilled water to dissolve the salt. The organic phase was separated and extracted four times with 600 milliliter portions of distilled water until the aqueous phase gave no positive chloride test with silver nitrate. The organic phase was then dried with sodium sulfate for 64 hours. The organic phase was then filtered through a No. 54 Whatman filter paper and vacuum topped for 9 hours to a constant weight in a rotary flash evaporator in a 60° C. bath at 0.5 millimeters of mercury pressure. The resulting colorless tris(allyl carbonate) weighed 470.4 grams for a theoretical yield of 95.8 percent after correcting for samples removed for analysis during reaction. It had a viscosity of 75 centistokes at 25° C., a refractive index, ($n_D^{20}$), of 1.4634, and a density of 1.129 grams per cubic centimeter at 25° C. The unsaturation was 97.5 percent of the theoretical.

EXAMPLE III

Three samples of the tris(allyl carbonate) monomer prepared in Example I were polymerized in test tubes and the Barcol hardness of the resulting polymers determined.

Each composition was prepared with the tris(allyl carbonate) monomer and di-sec-butyl peroxydicarbonate initiator in the amounts shown in Table I. Each composition was then heated according to the following cure schedule:

| Elapsed Hours | Temperature (Centigrade) |
|---|---|
| 0:00 | 43 |
| 2:00 | 44 |
| 3:40 | 45 |
| 5:10 | 46 |
| 6:30 | 47 |
| 7:35 | 48 |
| 8:30 | 49 |
| 9:30 | 50 |
| 10:30 | 51 |
| 11:10 | 52 |
| 12:00 | 53 |
| 12:35 | 54 |
| 13:25 | 55 |
| 13:56 | 56 |
| 14:25 | 58 |
| 14:55 | 60 |
| 15:25 | 64 |
| 15:55 | 68 |
| 16:25 | 74 |
| 16:50 | 79 |
| 17:10 | 88 |
| 17:55 | 105 |
| 18:00 | End |

The samples were then removed from the test tubes and had the Barcol hardness values shown in Table I.

Table I

| Allyl carbonate monomer (grams) | Sec-butyl peroxydicarbonate (grams) | Barcol Hardness (dimensionless) |
|---|---|---|
| 2.0 | 0.09 (4.6 wt %) | 22–19 |
| 2.7 | 0.08 (2.9 wt %) | 19–15 |
| 2.5 | 0.06 (2.3 wt %) | 17–13 |

EXAMPLE IV

Five samples of the tris(allyl carbonate) monomer prepared in Example I were polymerized in molds to form 1/16 inch thick sheets.

Each composition was prepared with the tris(allyl carbonate) monomer and diisopropyl peroxydicarbonate in the amounts shown in Table II. Each sample was then heated according to the following cure schedule:

| Elapsed Hours | Temperature (Centigrade) |
|---|---|
| 0:00 | 39 |
| 0:30 | 40 |
| 2:20 | 41 |
| 4:00 | 42 |
| 6:05 | 43 |
| 8:00 | 44 |
| 9:40 | 45 |
| 11:10 | 46 |
| 12:30 | 47 |
| 13:35 | 48 |
| 14:30 | 49 |
| 15:30 | 50 |
| 16:30 | 51 |
| 17:10 | 52 |
| 18:00 | 53 |
| 18:35 | 54 |
| 19:25 | 55 |
| 19:56 | 56 |
| 20:25 | 58 |
| 20:55 | 60 |
| 21:25 | 64 |
| 21:55 | 68 |
| 22:25 | 74 |
| 22:50 | 79 |
| 23:10 | 88 |
| 23:55 | 105 |
| 24:00 | End of Cycle |

The samples were then tested for Barcol hardness and had the values shown in Table II.

Table II

| Allyl carbonate monomer (grams) | Diisopropyl peroxydicarbonate (grams) | (wt %) | Barcol Hardness (dimensionless) |
|---|---|---|---|
| 9.0 | 1.0 | 10 | 12–8 |
| 9.2 | 0.8 | 8 | 18–18 |
| 9.4 | 0.67 | 6.07 | 17–9 |
| 9.5 | 0.5 | 5 | 24–18 |
| 9.7 | 0.3 | 3.3 | 17–10 |

EXAMPLE V

Two lenses were made, one with the polymerizate of the tris (allyl carbonate) synthesized in Example I and one with diethylene glycol bis(allyl carbonate).

The lenses were minus 4 diopter lenses cast between a 4.25 diopter front element and an 8.25 diopter back element, which elements were separated by 7 millimeter gasket. The cure cycle used was the same as that in Example III. The compositions used and the results obtained are as shown in Table III.

Table III

| | Comparison of Cast Lenses | |
|---|---|---|
| Monomer | Diethylene glycol bis (allyl carbonate) | Tris(allyl carbonate) (made in Example I) |
| Initiator | Diisopropylperoxy-dicarbonate | Diisopropylperoxy-dicarbonate |
| Weight percent initiator | 3.5% | 4.75% |
| Front mold curve | 2.54 | 2.54 |
| Front lens curve | 2.62 | 2.63 |
| Difference | 0.08 | 0.09 |
| Back mold curve | 5.060 | 5.065 |
| Back lens curve | 5.161 | 5.132 |
| Difference | 0.101 | 0.067 |

The tris(allyl carbonate) polymer lenses had less shrinkage than the diethylene glycol bis(allyl carbonate) polymer lenses.

Although this invention has been described in terms of specific details and embodiments, the description is not intended to limit the invention, the scope of which is defined in the following claims.

I claim:

1. An allyl carbonate monomer having the formula:

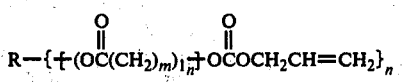

where the $l_n$'s are integers from 0 to 5, the sum of the $l_n$'s is at least 2, m is 4 or 5, n is greater than 2 and R is chosed from the group consisting of

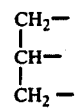

and

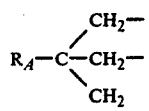

where $R_A$ is chosen from the group consisting of —H, —CH$_3$, —CH$_2$CH$_3$, —CH$_2$CH$_2$CH$_3$, and —CH$_2$CH$_2$CH$_2$CH$_3$.

2. An allyl carbonate monomer having the formula:

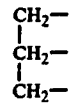

where the $l_n$'s are integers from 0 to 5, the sum of the $l_n$'s is at least 2, X is —H or —CH$_3$, n is greater than 2 and R is chosen from the group consisting of

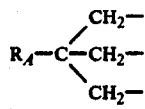

and where $R_A$ is chosen from the group consisting of —H, —CH$_3$, —CH$_2$CH$_3$, —CH$_2$CH$_2$CH$_3$, and —CH$_2$CH$_2$CH$_2$CH$_3$.

* * * * *